(12) United States Patent
Look

(10) Patent No.: US 6,894,615 B2
(45) Date of Patent: May 17, 2005

(54) ARTICLE WITH RETROREFLECTIVE AND RADIO FREQUENCY-RESPONSIVE FEATURES

(75) Inventor: Thomas F. Look, Ham Lake, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/974,385

(22) Filed: Oct. 9, 2001

(65) Prior Publication Data

US 2003/0067389 A1 Apr. 10, 2003

(51) Int. Cl.⁷ .............................................. G08B 13/14
(52) U.S. Cl. ................. 340/572.1; 340/693.5; 340/933; 340/941; 343/741; 343/866; 343/892; 343/711; 343/713
(58) Field of Search ........................... 340/572.1, 693.5, 340/933, 941; 343/741, 866, 892, 711, 713

(56) References Cited

U.S. PATENT DOCUMENTS

| | | | |
|---|---|---|---|
| 3,752,960 A | 8/1973 | Walton | 235/61.11 |
| 3,816,708 A | 6/1974 | Walton | 235/61.11 |
| 4,001,822 A * | 1/1977 | Sterzer | 343/6.5 SS |
| 4,223,830 A | 9/1980 | Walton | 235/380 |
| 4,578,654 A | 3/1986 | Tait | 333/175 |
| 4,580,041 A | 4/1986 | Walton | 235/380 |
| 4,583,083 A | 4/1986 | Bogasky | 340/572 |
| 4,598,276 A | 7/1986 | Tait | 340/572 |
| 4,660,025 A | 4/1987 | Humphrey | 340/572 |
| 4,837,568 A | 6/1989 | Snaper | 340/825 |
| 4,857,893 A | 8/1989 | Carroll | 340/572 |
| 4,940,966 A | 7/1990 | Pettigrew et al. | 340/551 |
| 4,964,053 A | 10/1990 | Humble | 364/466 |
| 5,019,815 A | 5/1991 | Lemelson et al. | 340/933 |
| 5,030,807 A | 7/1991 | Landt et al. | |
| 5,059,951 A | 10/1991 | Kaltner | 340/572 |
| 5,119,070 A | 6/1992 | Matsumoto et al. | 340/572 |
| 5,151,684 A | 9/1992 | Johnsen | 340/572 |
| 5,432,864 A | 7/1995 | Lu et al. | 382/118 |
| 5,444,223 A | 8/1995 | Blama | 235/435 |
| 5,490,079 A | 2/1996 | Sharpe et al. | 364/467 |
| 5,497,140 A | 3/1996 | Tuttle | 342/51 |
| 5,621,571 A * | 4/1997 | Bantli et al. | 359/529 |
| 5,635,693 A | 6/1997 | Benson et al. | 235/384 |

(Continued)

FOREIGN PATENT DOCUMENTS

| | | | | |
|---|---|---|---|---|
| EP | 0 892 399 A2 | 1/1999 | | |
| EP | 1 120 739 A2 | 8/2001 | | |
| WO | WO 98/27670 | 6/1998 | | H04B/7/08 |
| WO | WO 99/45513 | 9/1999 | | |
| WO | WO 01/57807 A1 | 8/2001 | | G07C/9/00 |

OTHER PUBLICATIONS

Product Bulletin 3750E/3770E entitled 3M Scotchlite™Reflective License Plate Sheeting, Series 3750E/3770E with Ensure™Image for Use on Multi–Year License Plates; Jan. 1997 (5 pgs.).

Primary Examiner—Benjamin C. Lee
Assistant Examiner—Tai T. Nguyen
(74) Attorney, Agent, or Firm—Melissa E. Buss

(57) ABSTRACT

The present disclosure includes a system that provides visual and electronic information in a readily identifiable system. For example, the present disclosure is directed to a combination tag, suitable for use as a vehicle identification window sticker. The combination tag includes a retroreflective article having an optical surface and a radio frequency responsive element. The radio frequency-responsive element includes an antenna and an integrated circuit. The radio frequency-responsive element has information storage and transmission capabilities adapted to enable an interrogation system to obtain information from the radio frequency-responsive element. The radio frequency-responsive element is operably coupled to the retroreflective article.

38 Claims, 3 Drawing Sheets

U.S. PATENT DOCUMENTS

| | | | |
|---|---|---|---|
| 5,656,360 A | | 8/1997 | Faykish et al. ............. 428/195 |
| 5,657,008 A | * | 8/1997 | Bantli ........................ 340/933 |
| 5,729,201 A | | 3/1998 | Jahnes et al. ................ 340/572 |
| 5,745,036 A | | 4/1998 | Clare ......................... 340/572 |
| 5,757,521 A | | 5/1998 | Walters et al. |
| 5,831,532 A | | 11/1998 | Gambino et al. ........... 340/572 |
| 5,844,523 A | | 12/1998 | Brennan et al. |
| 5,913,543 A | * | 6/1999 | Curiel ......................... 283/94 |
| 5,939,984 A | | 8/1999 | Brady et al. ............. 340/572.1 |
| 5,981,040 A | | 11/1999 | Rich et al. |
| 6,025,784 A | * | 2/2000 | Mish ........................ 340/693.5 |
| 6,107,920 A | | 8/2000 | Eberhardt et al. |
| 6,121,880 A | | 9/2000 | Scott et al. ............... 350/572.5 |
| 6,147,605 A | | 11/2000 | Vega et al. |
| 6,154,137 A | | 11/2000 | Goff et al. ............... 340/572.4 |
| 6,156,442 A | | 12/2000 | Phillips |
| 6,164,548 A | | 12/2000 | Curiel |
| 6,317,149 B1 | | 11/2001 | Mochida et al. |
| 6,384,727 B1 | | 5/2002 | Diprizio et al. |
| 6,582,887 B2 | | 6/2003 | Luch |

* cited by examiner

2

ARTICLE WITH RETROREFLECTIVE AND RADIO FREQUENCY-RESPONSIVE FEATURES

BACKGROUND

The present disclosure relates to articles having both retroreflective features and radio frequency-responsive features. More specifically, the present disclosure relates to a security tag, adapted for use as a window sticker, incorporating retroreflective features and radio frequency-responsive features suitable for use for fraud resistance and information retrieval.

Vehicle license plates are one typical article commonly used to identify vehicles and the corresponding owners of the vehicles. Vehicle license plates convey a limited amount of information that typically includes a license number and a state, province, or country of registration, as well as whether the owner has a current license plate. License plates typically are formed of a retroreflective sheet and have security features such as a directional image, such as an Ensure™ image available on license plate sheeting from Minnesota Mining and Manufacturing Company of St. Paul, Minn. and sold under the trade designation 3750E. This feature is difficult to counterfeit and facilitates immediate visual verification of finished license plate authenticity.

Radio frequency identification technology, sometimes referred to as RFID technology, has a variety of commercial applications, and is typically used for object identification and tracking from a limited distance. A radio frequency-responsive element can include electronic information identifying the object.

There exists a need to provide additional security and information currently provided by either license plates or RFID technology. Further there exists a need to provide additional protection against fraud or counterfeiting. For example, there exists a need for secure vehicle identification system that conveys an appropriate amount of information and one where it is difficult to use this system with anything but its intended vehicle.

SUMMARY

The present disclosure includes a system that provides visual and electronic information in a readily identifiable system. For example, the present disclosure is directed to a combination tag, suitable for use as a vehicle identification window sticker. The combination tag includes a retroreflective article having an optical surface and a radio frequency responsive element. The radio frequency-responsive element includes an antenna and an integrated circuit. The radio frequency-responsive element has information storage and transmission capabilities adapted to enable an interrogation system to obtain information from the radio frequency-responsive element. The radio frequency-responsive element is operably coupled to the retroreflective article. In one example, the tag includes an adhesive disposed on the optical surface and the radio frequency-responsive element. This adhesive can be used to attach the tag to the inside of a vehicle window. In one example, the adhesive is a high strength adhesive that will destroy the radio frequency-responsive element by tearing if someone were to attempt to remove the tag from the window. Information stored in the radio frequency-responsive element can be coordinated with visual information on the retroreflective article to convey an appropriate amount of information and for additional security.

DETAILED DESCRIPTION

Figure 1:
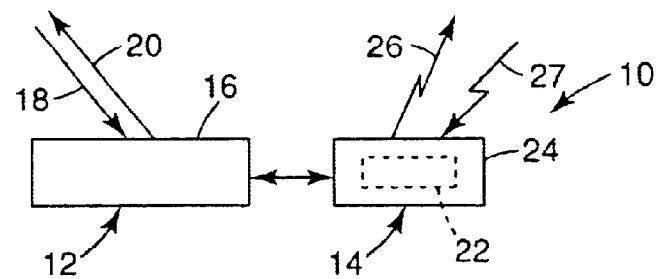
FIG. 1 shows a block diagram of a combination tag.

The combination tag of the present disclosure incorporates both a retroreflective article and an element responsive to a radio frequency signal to form a secure vehicle identification system. FIG. 1 shows a block diagram of such a combination tag 10. Tag 10 includes a retroreflective article 12 operably coupled to a radio frequency responsive element 14. The retroreflective article 12 includes an optical surface 16 where light incident on the optical surface 16 at various angles, indicated by ray 18, is reflected generally anti-parallel, indicated by ray 20, and back towards the light source (not shown). The radio frequency-responsive element 14 has information storage and transmission capability and includes an integrated circuit 22, shown in phantom, and an antenna 24. Element 14 is adapted to enable an interrogation system to obtain information from the element, indicated by electromagnetic waves 26, 27 and discussed in more detail below.

Figure 2A:
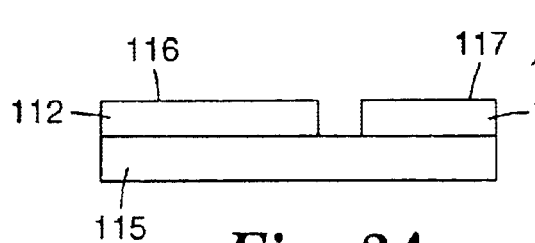
FIGS. 2A and 2B show schematic side views of two examples of the tag of FIG. 1.
Figure 2B:
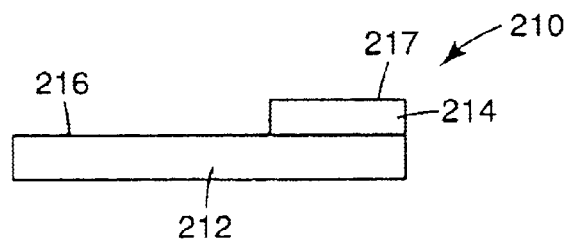

FIGS. 2A and 2B show a schematic side view of two examples of the retroreflective article 12 operably coupled to the radio frequency-responsive element 14. Other examples are contemplated. Typical radio frequency-responsive elements do not work correctly, or detune, when operated close to metal. Typical radio frequency-responsive elements become detuned when within about a quarter inch, or 6 mm, of metal. Several forms of retroreflective articles rely on a metallized surface for operation. In such cases the radio frequency-responsive element will become detuned if placed directly on the metallized retroreflective article. FIG. 2A shows a tag 110 with metallized retroreflective article 112 spaced apart from a radio frequency-responsive element 114 on a substrate 115. The optical surface 116 of the article 112 is generally facing in the same direction as an exposed major surface 117 of the radio frequency-responsive element 114. In the example shown, substrate 115 does not include a metal. Radio frequency-responsive element 114 is spaced apart from the metallized retroreflective article 112 on substrate 115 so as not to significantly interfere with the operation of element 114. FIG. 2B shows a tag 210 where the radio frequency-responsive element 214 is placed directly on the optical surface 216 of a non-metallized retroreflective article 212, without the need for a separate substrate. Radio frequency-responsive element 214 includes an exposed major surface 217 generally facing in the same direction as the optical surface 216. The tags 110, 210 can also further include an adhesive (not shown) applied to the optical surfaces 116, 216, respectively, and to the exposed major surfaces 117, 217, respectively, and thus applied to the inner surface of a vehicle window, or the like, so the tags 110, 210 can be read from outside of the vehicle.

Radio frequency-responsive elements can be either active or passive. An active tag incorporates an additional energy source, such as a battery, into the tag construction. This energy source permits active radio frequency-responsive elements to create and transmit strong response signals even in regions where the interrogating radio frequency field is weak, and thus an active radio frequency-responsive element can be detected at greater range. However, the relatively short lifetime of the battery limits the useful life of the tag. In addition, the battery adds to the size and cost of the tag. A passive element derives the energy needed to power the element from the interrogating radio frequency field, and uses that energy to transmit response codes by modulating the impedance the antenna presents to the interrogating field, thereby modulating the signal reflected back to the reader antenna. Thus, their range is more limited. Because passive elements are preferred for many applications, the remainder of the discussion will be confined to this class of element. Those skilled in the art, however, will recognize that these two types of elements share many features and that both can be used in the examples of this disclosure.

Figure 3:
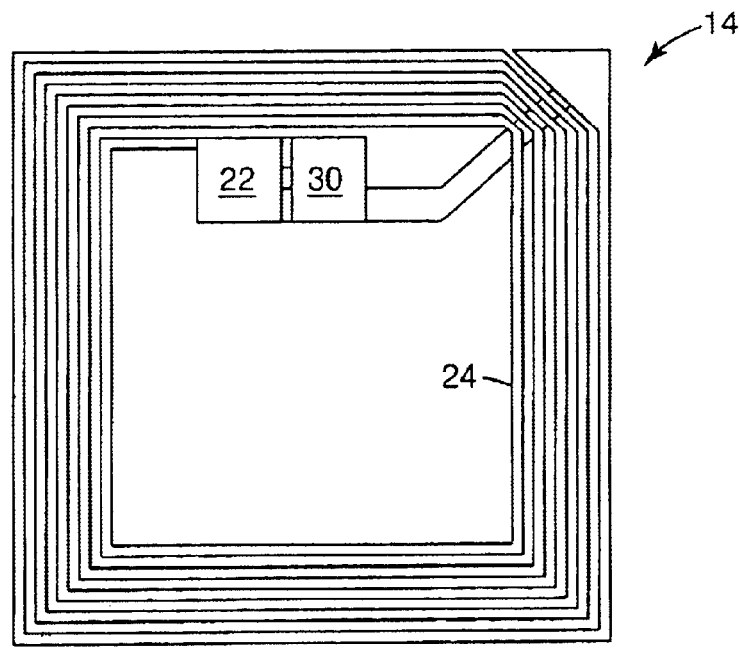
FIG. 3 shows a plan schematic view of a radio frequency-responsive element used in the tag of FIG. 1.

As shown in FIG. 3, a passive radio frequency-responsive element 14 typically includes two components: an integrated circuit 22 and an antenna 24. The integrated circuit provides the primary identification function. It includes software and circuitry to permanently store the tag identification and other desirable information, interpret and process commands received from the interrogation hardware, respond to requests for information by the interrogator, and assist the hardware in resolving conflicts resulting from multiple tags responding to interrogation simultaneously. Optionally, the integrated circuit may provide for updating the information stored in its memory (read/write) as opposed to just reading the information out (read only). Integrated circuits suitable for use in radio frequency-responsive elements include those available from Texas Instruments (in their TIRIS line of products), Philips (in their Mifare and Hitag line of products), Motorola/Indala, and Single Chip Systems, among others. One example is a tag from Texas Instruments sold under the trade designation #RI-I01-110A.

The antenna geometry and properties depend on the desired operating frequency of the radio frequency-responsive portion of the tag. For example, 2.45 GHz (or similar) radio frequency-responsive elements would typically include a dipole antenna, such as the linear dipole antennas (not shown), or folded dipole antennas (not shown). A 13.56 MHz (or similar) radio frequency-responsive element would use a spiral or coil antenna 24. In either case, the antenna 24 intercepts the radio frequency energy radiated by an interrogation source. This signal energy carries both power and commands to the tag. The antenna enables the radio frequency-responsive element to absorb energy sufficient to power the IC chip and thereby provide the response to be detected. Thus, the characteristics of the antenna must be matched to the system in which it is incorporated. In the case of tags operating in the high MHz to GHz range, an important characteristic is the antenna length. Typically, the effective length of a dipole antenna is selected so that it is close to a half wavelength or multiple half wavelength of the interrogation signal. In the case of tags operating in the low to mid MHz region (13.56 MHz, for example) where a half wavelength antenna is impractical due to size limitations, the important characteristics are antenna inductance and the number of turns on the antenna coil. For both antenna types, good electrical conductivity is required. Typically, metals such as copper or aluminum would be used, but other conductors, including magnetic metals such as permalloy, are also acceptable. It is also important that the input impedance of the selected IC chip match the impedance of the antenna for maximum energy transfer.

A capacitor 30 is often included to increase the performance of the marker. The capacitor 30, when present, tunes the operating frequency of the tag to a particular value. This is desirable for obtaining maximum operating range and insuring compliance with regulatory requirements. The capacitor may either be a discrete component, or integrated into the antenna as described below. In some tag designs, particularly tags designed to operate at very high frequencies, such as 2.45 GHz, a tuning capacitor is not required. The capacitor is selected so that, when coupled to the inductance provided by the antenna, the resonant frequency of the composite structure, given by:

$$f_r = \left(\frac{1}{2\pi}\right)\sqrt{\frac{1}{LC}}$$

where
C=capacitance (in Farads)
L=inductance (in Henries)
closely matches the desired operating frequency of the RFID system. The capacitor may also be a distributed capacitor as described in U.S. Pat. Nos. 4,598,276 (Tait et al.) and U.S. Pat. No. 4,578,654 (Tait et al.), which are assigned to 3M. Distributed capacitance is desirable to reduce tag size, particularly thickness, and to minimize manual assembly.

Figure 4:
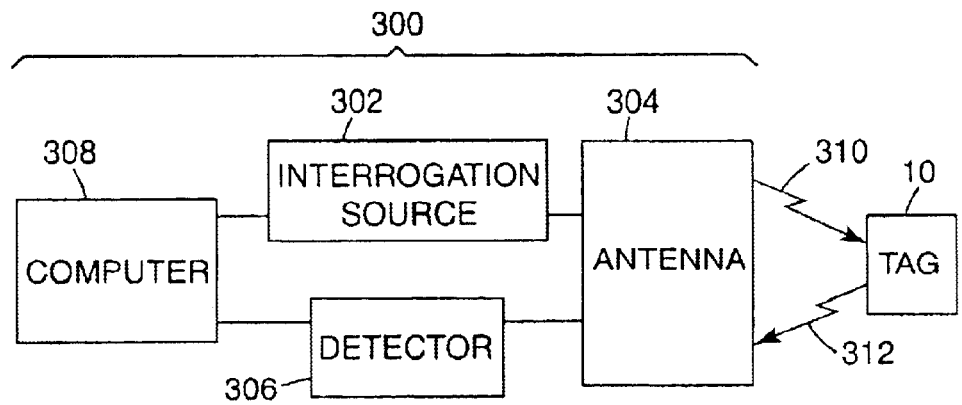
FIG. 4 is a block diagram of an RFID interrogation system interacting with the radio frequency-responsive element of FIG. 3.

In operation, as shown in FIG. 4, the radio frequency-responsive tag 10 is interrogated by an electronic article security system 300, which is typically located near the point at which the tags are to be monitored. Hand held detection devices may be used. An interrogation source 302 (typically including a drive oscillator and an amplifier) is coupled to an antenna 304 (sometimes described as a field coil) for transmitting an alternating radio frequency field, or interrogation signal, in the interrogation zone. The system 300 also includes an antenna for receiving a signal (shown as antenna 304, and sometimes described as a receiving coil) and detector 306 for processing signals produced by tags in the interrogation zone.

The interrogation source 302 transmits an interrogation signal 310, which may be selected within certain known frequency bands that are preferred because they do not interfere with other applications, and because they comply with applicable government regulations. When the radio frequency-responsive element receives an interrogation signal it transmits its own response code signal 312 that is received by the antenna 304 and transmitted to detector 306. The detector decodes the response, identifies the tag (typically based on information stored in a computer or other memory device 308), and takes action based on the code signal detected. Various modifications of the illustrated system are known to those of skill in the art including, for example, using separate antennas for the interrogation source 302 and the detector 306 in place of the single antenna 304 that is illustrated.

Figure 5:
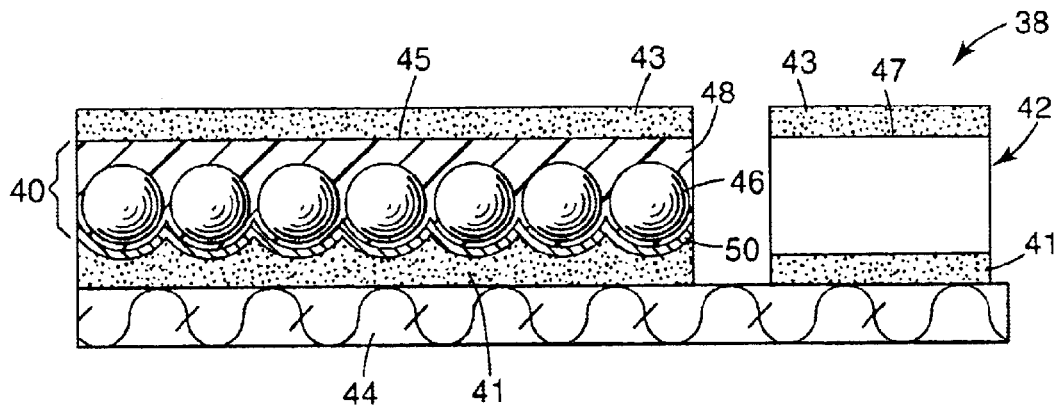
FIG. 5 is a section side schematic view of an example of the tag of FIG. 1.

FIG. 5 shows a section schematic side view of an example of a tag 38 with a metallized retroreflective article 40 and a radio frequency-responsive element 42 spaced apart from each other on a substrate 44. The radio frequency-responsive article can be that described above with respect to FIG. 3. The substrate 44 is a durable element suited for long life in its intended application and is adapted not to detune the radio frequency responsive element 42. In the example shown, the substrate 44 is a polymer paper, such as a polypropylene paper available from Ritrama. An adhesive 41, such as an acrylate pressure sensitive adhesive, is used to attach the retroreflective article 40 and radio frequency-responsive element 42 to the substrate 44. An adhesive 43 is applied to the optical surface 45 and exposed surface 47 of the retroreflective article 40 and radio frequency-responsive element 42. In the example shown, adhesive 43 is transparent. Also, adhesives 41, 43 may fill the gap on the substrate between the retroreflective article 40 and radio frequency-responsive element 42.

The retroreflective article 40 is one example of several forms of microsphere type retroreflectors suitable for use in the tag 38. In the example, the retroreflective article 40 includes an enclosed monolayer of optical spheres 46, which in the example are formed from glass, that are coated in a spacing resin 48 comprising, for example, polyvinylbutyral or polyester. A specular reflector layer 50 underlies the spacing resin 48. The reflector layer 50 can comprise opaque materials such as silver, aluminum, chromium, nickel, or magnesium or a transparent high-index reflector layer such as bismuth, trioxide, zinc sulfide, titanium dioxide or zirconium oxide, or multilayer reflectors. Light enters the retroreflective article 40 through the spacing resin 48 and is focused by the microspheres 46. Light is then reflected by the reflector layer 50 back through the microspheres 46 and spacing resin 48 toward the light source.

Variations on the microsphere type retroreflective article are contemplated. For example, the optical spheres can be partially embedded within a spacing resin and coated with a bead bond layer such that the spacing resin is between the reflector layer and the bead bond layer. The bead bond layer can contain a colored pigment that gives the retroreflective article a colored appearance in ambient light and a different appearance, such as silver, in retroreflected light. Another variation of the retroreflective article includes an exposed monolayer of microspheres.

Figure 6:
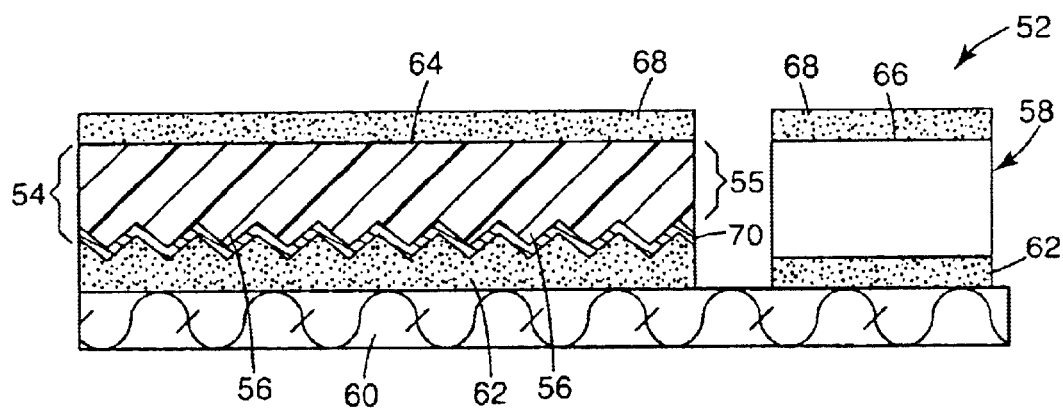
FIG. 6 is a section side schematic view of another example of the tag of FIG. 1.

FIG. 6 shows another section schematic side view of an example of a tag 52 with a metallized retroreflective article 54 including a cube corner retroreflector 55 having a multiplicity of cube corner retroreflective element 56 instead of microspheres. The retroreflective article 54 and radio frequency-responsive element 58 are spaced apart from each other on a substrate 60 an attached to the substrate with an adhesive 62. The optical surface 64 of the retroreflective article 54 and exposed surface 66 of the radio frequency-responsive element 58 are coated with an adhesive 68.

The cube corner retroreflector 55 can be formed from a suitable thermoplastic material such as vinyl, polycarbonate, acrylate or other material, or can be formed by curing a material such as urethane, epoxy, polyester, and acrylate ologomers or monomers. Cube corner elements 56 typically have three mutually perpendicular faces that cooperate to retroreflect light toward the light source. In the example shown, the retroreflector 55 is a monolithic member including the cube corner element 56. Alternatively, the cube corner elements can be attached to a backing to form the retroreflector. In this case, the cube corner elements may be formed of a material other than the material used to form the backing. The retroreflector 55 can include an overlay (not shown) attached to the optical surface 64. The overlay can be formed of an acrylate or a polyethyleneterephalate/co-polyethyleneterephalate laminate. The adhesive 68 would be applied to the overlay.

In the example shown, the retroreflective article 54 includes a specularly reflective layer 70 attached to the cube corner elements 56. The reflective layer 70 can be formed from the same materials used to form the reflector layer 50 in FIG. 5. Light entering the cube corner retroreflector 55 from the optical surface 64 is specularly reflected off of the three mutually perpendicular faces of the cube corner element 55 and returned toward the light source.

In the example shown, the specularly reflective layer 70 is formed of a material that will detune the radio frequency-responsive element 58 if the radio frequency-responsive element is placed too close to the retroreflective article 54, i.e., the cube corner elements 56 are metallized. Accordingly, the radio frequency-responsive element 58 is spaced apart from the retroreflective article 54 a sufficient distance so as not to substantially effect the performance of the radio frequency-responsive element 58.

Figure 7:
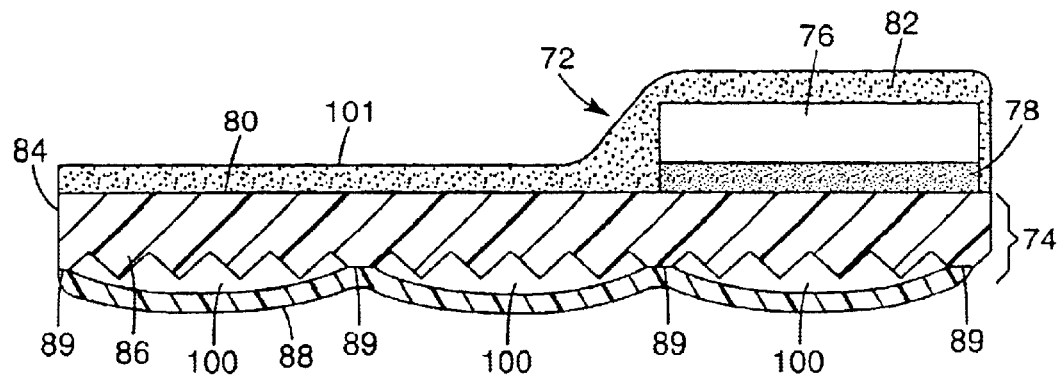
FIG. 7 is a section side schematic view of still another example of the tag of FIG. 1.

FIG. 7 is another section schematic side view of a tag 72 with non-metallized retroreflective article 74 so that the radio frequency-responsive element 76 is attached directly to the retroreflective article 74. An adhesive 78 is used to attach the radio frequency-responsive article to the optical surface 80. In the example, the exposed surface 82 of the radio frequency-responsive element 76 is facing in the same direction as the optical surface 80. The retroreflective article 74 includes a cube corner retroreflector 84 with a multiplicity of cube corner elements 86. The cube corner retroreflector 84 and cube corner elements 86 can be formed in the same manner as described above. Also, the cube corner retroreflector 84 can include an overlay (not shown) where adhesive 78 is deposited on the overlay, as described above. The retroreflector 84 includes a backing 88 attached to the cube corner elements 86 at various locations 89 in order to seal the cube corner elements 86 from the ambient environment and to prevent moisture or dirt, or the like, from collecting on the cube corner elements 86. The backing 88 maintains an air interface 100 with the cube corner elements 86, which permits retroreflection. The retroreflective indices of the air interface 100 and the materials to form the cube corner elements 86 are such that light entering the reflector 84 through the optical surface 80 at certain angles will not pass through the transparent cube corner elements 86. Rather, the light will be reflected off each of the three mutually perpendicular faces within the cube corner elements 86 and returned toward the source. The backing 88 can be made from a variety of materials, such as a polyethyleneterephalate/co-polyethyleneterephalate laminate. An adhesive 101 covers the tag 72.

In some examples, the adhesive placed on the optical and exposed surfaces is a high strength adhesive and attached directly to the antenna of the radio frequency-responsive element. The antenna will become torn and thus destroyed if someone were to try to remove the antenna from the inside of a vehicle window. In another example, a release agent can be placed on various locations of the antenna or the high strength adhesive and used in combination with the high strength adhesive. When removal is attempted, differential release caused by including the release agent will cause the adhesive to be in release causing more tearing of the antenna. One variation of this example is to use two or more adhesives on the radio frequency-responsive element, where each adhesive has a different strength or adhesion value. Destruction of the antenna provides for increased security. (If this additional security is not required, the radio frequency-responsive element including the exposed surface can be encased in a polymeric material and attached to the tag such that the adhesive does not directly contact the radio frequency-responsive element.)

For additional security, the tag 10 can include other coated or uncoated visual information. For example, the retroreflective article 12 can include a holographic layer, or a retroreflective article can be directionally imaged or included with a floating image as now known in the art. Another example is to use the data in the radio frequency-responsive element 14 as an encrypting code to information on the tag such as a bar code or a dot code. One example of a dot code is by Veritech, Inc. of Van Nuys, Calif. The combination would provide for the dot code on each tag to be different so that a fraudulent method of decoding one tag would not work for other tags. One skilled in the art can recognize that the visual information on the tag such as a dot code can be used to decode information in the radio frequency-responsive element as well.

Figure 8:
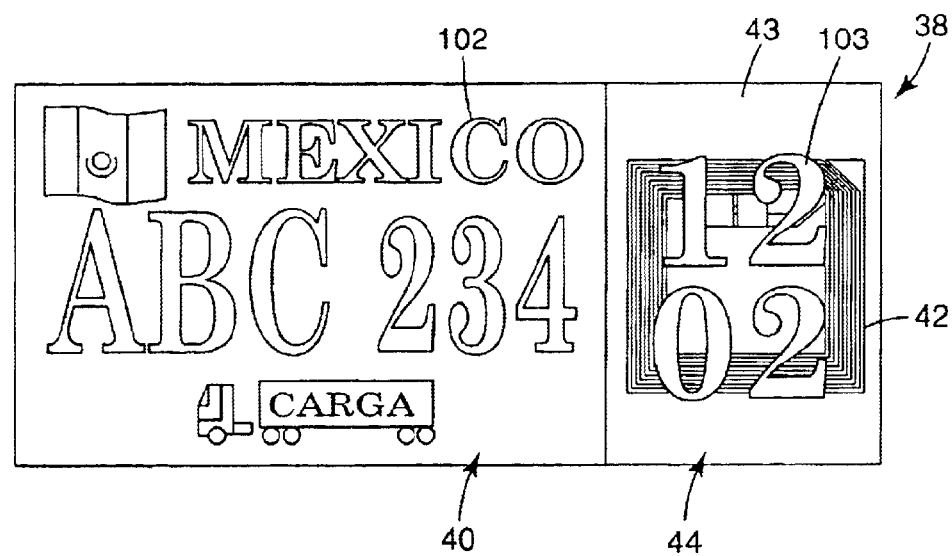
FIG. 8 is a plan view of an example of the tag of FIG. 1.

FIG. 8 shows a plan view of one example of the tag 10. This example is based on the example of FIG. 5 above. Tag 38 includes retroreflective article 40 and radio frequency-responsive element 42 attached to substrate 44. The retroreflective article 40 is available from Minnesota Mining and Manufacturing Company of St. Paul, Minn. under the designation 3750. The retroreflective article 40 includes printed indicia 102 in the form of the graphics of a Mexican license plate. The radio frequency-responsive element 42 also includes printed indicia 103 that in addition to providing visual information, serves to obscure in part the radio frequency-responsive element 42. Printed indicia 103 should not include a metallized ink that will detune the element 42. A pressure sensitive adhesive 43 covers the tag 38 and may include a release agent deposited on portions of the antenna on the radio frequency-responsive element 42. In this example, the retroreflective article 40 and radio frequency-responsive element 42 can be used to verify vehicle registration. The radio frequency-responsive element 42 can be electronically read and the information compared to the license plate and vehicle identification number to assure that it is legitimate. In the example shown, the radio frequency-responsive element 42 can be updated when registration taxes or insurance payments are made providing an immediate method of verification for law enforcement officials.

Various modifications and combinations of the embodiments disclosed will be apparent to those skilled in the art, and those modifications are intended to be within the scope of the invention as defined in the appended claims.

What is claimed is:

1. A vehicle identification window sticker comprising:
    a retroreflective article having an optical surface; and
    a radio frequency-responsive element attached to the retroreflective article, wherein the radio frequency-responsive element comprises an antenna and an integrated circuit, wherein the radio frequency-responsive element has information storage and transmission capabilities adapted to enable an interrogation system to obtain information from the radio frequency-responsive element, wherein the radio frequency-responsive element comprises an exposed surface and an adhesive disposed on the exposed surface, the adhesive having an adhesive strength sufficient to tear the radio frequency-responsive element when the vehicle identification window sticker is adhered to a vehicle window by the adhesive and subsequently removed from the vehicle window.

2. The vehicle identification window sticker of claim 1, wherein the exposed surface faces in the same direction as the optical surface and the adhesive is disposed on the optical surface and the exposed surface.

3. The vehicle identification window sticker of claim 2, wherein the exposed surface has disposed thereon a plurality of adhesives to adhere the vehicle identification window sticker to the vehicle window including a first pressure sensitive adhesive having a fist adhesion value and a second pressure sensitive adhesive having a second adhesion value greater than the first adhesion value, and further wherein the second adhesion value of the second pressure sensitive adhesive has a strength sufficient to tear the antenna when the vehicle identification window sticker is subsequently removed from the vehicle window.

4. The vehicle identification window sticker of claim 3, wherein the first and second pressure sensitive adhesives are disposed directly on the antenna.

5. The vehicle identification window sticker of claim 2 having a release agent selectively disposed on at least one of the adhesive and the antenna.

6. The vehicle identification window sticker of claim 1, wherein the retroreflective article is a non-metallized cube corner article and the radio frequency-responsive element is attached to the optical surface.

7. The vehicle identification window sticker of claim 1, wherein the retroreflective article includes a metallized portion, and wherein the radio frequency-responsive element is attached beside the metallized portion.

8. The vehicle identification window sticker of claim 7, wherein the retroreflective article further includes a substrate, and wherein the retroreflective article and the radio frequency-responsive element are attached to the substrate such that the retroreflective article is spaced apart from the radio frequency-responsive element.

9. The vehicle identification window sticker of claim 7, wherein the retroreflective article includes one of a metallized cube corner article or a microsphere type article.

10. The vehicle identification window sticker of claim 1, wherein the retroreflective article includes printed indicia on the top surface.

11. The vehicle identification window sticker of claim 10, wherein the printed indicia includes a non-metallized ink.

12. The vehicle identification window sticker of claim 1, wherein the radio frequency-responsive element includes printed indicia thereon.

13. A vehicle identification window sticker comprising:
    a retroreflective article having an optical surface; and
    a radio frequency-responsive element attached to the retroreflective article, wherein the radio frequency-responsive element comprises an antenna and an integrated circuit, wherein the radio frequency-responsive element has information storage and transmission capabilities adapted to enable an interrogation system to obtain information from the radio frequency-responsive element, wherein the radio frequency-responsive element comprises an exposed surface and an adhesive disposed on the exposed surface to attach the vehicle identification window sticker to a vehicle window, and wherein the adhesive comprises a first adhesive having a first adhesion value and a second adhesive having a second adhesion value that is greater than the first adhesion value and of sufficient strength to tear the radio frequency-responsive element when the vehicle identification window sticker is removed from the vehicle window.

14. The vehicle identification window sticker of claim 13, wherein the first adhesive is a first pressure sensitive adhesive and the second adhesive is a second pressure sensitive adhesive.

15. The vehicle identification window sticker of claim 14, wherein the first and second pressure sensitive adhesives are disposed directly on the antenna.

16. The vehicle identification window sticker of claim 13, wherein the radio frequency-responsive element includes an exposed surface facing in the same direction as the optical surface.

17. The vehicle identification window sticker of claim 13 further comprising a release agent selectively disposed on at least one of the adhesive and the antenna.

18. The vehicle identification window sticker of claim 13, wherein the retroreflective article is a non-metallized cube corner article and the radio frequency-responsive element is attached to the optical surface.

19. The vehicle identification window sticker of claim 13, wherein the retroreflective article includes a metallized portion, and wherein the radio frequency-responsive element is attached beside the metallized portion.

20. The vehicle identification window sticker of claim 19, wherein the retroreflective article further includes a substrate, and wherein the retroreflective article and the radio frequency-responsive element are attached to the substrate such that the retroreflective article is spaced apart from the radio frequency-responsive element.

21. The vehicle identification window sticker of claim 19, wherein the retroreflective article includes one of a metallized cube corner article or a microsphere type article.

22. The vehicle identification window sticker of claim 13, wherein the retroreflective article includes printed indicia an the top surface.

23. The vehicle identification window sticker of claim 22, wherein the printed indicia includes a non-metallized ink.

24. The vehicle identification window sticker of claim 13, wherein the radio frequency-responsive element includes printed indicia thereon.

25. A vehicle identification window sticker comprising:
a retroreflective article having an optical surface and printed information; and
a radio frequency-responsive element attached to the retroreflective article, wherein the radio frequency-responsive element comprises an antenna and an integrated circuit, wherein the radio frequency-responsive element has information storage and transmission capabilities adapted to enable an interrogation system to obtain information from the radio frequency-responsive element, wherein the radio frequency-responsive element includes information associated with the printed information on the retroreflective article, and comprises an adhesive disposed directly on the antenna to adhere the vehicle identification window sticker to a vehicle window and having a strength sufficient to tear the antenna when the vehicle identification window sticker is subsequently removed from the vehicle window.

26. The vehicle identification window sticker of claim 25, wherein the adhesive comprises a first adhesive having a first adhesion value and a second adhesive having a second adhesion value greater than the first adhesion value.

27. The vehicle identification window sticker of claim 26, wherein the first adhesive is a first pressure sensitive adhesive and the second adhesive is a second pressure sensitive adhesive.

28. The vehicle identification window sticker of claim 27, wherein the first and second pressure sensitive adhesives are disposed directly on the antenna.

29. The vehicle identification window sticker of claim 25, wherein the radio frequency-responsive element includes an exposed surface facing in the same direction as the optical surface.

30. The vehicle identification window sticker of claim 25, wherein the radio frequency-responsive element comprises an exposed surface and an adhesive disposed on the exposed surface, and wherein when the vehicle identification window sticker is adhered to a vehicle window by the adhesive and subsequently removed from the a vehicle window, the radio frequency-responsive element will become torn.

31. The vehicle identification window sticker of claim 30 further comprising a release agent selectively disposed on at least one of the adhesive and the antenna.

32. The vehicle identification window sticker of claim 25, wherein the retroreflective article is a non-metallized cube corner article and the radio frequency-responsive element is attached to the optical surface.

33. The vehicle identification window sticker of claim 25, wherein the retroreflective article includes a metallized portion, and wherein the radio frequency-responsive element is attached beside the metallized portion.

34. The vehicle identification window sticker of claim 33, wherein the retroreflective article further includes a substrate, and wherein the retroreflective article and the radio frequency-responsive element are attached to the substrate such that the retroreflective article is spaced apart from the radio frequency-responsive element.

35. The vehicle identification window sticker of claim 33, wherein the retroreflective article includes one of a metallized cube corner article or a microsphere type article.

36. The vehicle identification window sticker of claim 25, wherein the retroreflective article includes printed indicia on the top surface.

37. The vehicle identification window sticker of claim 36, wherein the printed indicia includes a non-metallized ink.

38. The vehicle identification window sticker of claim 25, wherein the radio frequency responsive element includes printed indicia thereon.

* * * * *

UNITED STATES PATENT AND TRADEMARK OFFICE
CERTIFICATE OF CORRECTION

PATENT NO. : 6,894,615 B2  
DATED : May 17, 2005  
INVENTOR(S) : Look, Thomas F.

It is certified that error appears in the above-identified patent and that said Letters Patent is hereby corrected as shown below:

Column 8,  
Line 2, delete "fist" and insert -- first --.

Column 9,  
Line 22, delete "an" and insert -- on --.

Column 10,  
Line 46, delete "frequency responsive" and insert -- frequency-responsive --.

Signed and Sealed this

Twenty-third Day of August, 2005

JON W. DUDAS  
*Director of the United States Patent and Trademark Office*